United States Patent
Ichikawa et al.

(10) Patent No.: US 12,477,953 B2
(45) Date of Patent: Nov. 18, 2025

(54) DOMAIN WALL MOVEMENT ELEMENT, MAGNETORESISTIVE ELEMENT, AND MAGNETIC ARRAY

(71) Applicant: TDK CORPORATION, Tokyo (JP)

(72) Inventors: Shinto Ichikawa, Tokyo (JP); Tatsuo Shibata, Tokyo (JP)

(73) Assignee: TDK CORPORATION, Tokyo (JP)

( * ) Notice: Subject to any disclaimer, the term of this patent is extended or adjusted under 35 U.S.C. 154(b) by 122 days.

(21) Appl. No.: 18/426,880

(22) Filed: Jan. 30, 2024

(65) Prior Publication Data

US 2025/0248315 A1 Jul. 31, 2025

(51) Int. Cl.
| | |
|---|---|
| H10N 50/10 | (2023.01) |
| G11C 11/16 | (2006.01) |
| G11C 19/08 | (2006.01) |
| H10B 61/00 | (2023.01) |
| H10N 50/85 | (2023.01) |

(52) U.S. Cl.
CPC ........... *H10N 50/10* (2023.02); *G11C 11/161* (2013.01); *G11C 11/1673* (2013.01); *G11C 11/1675* (2013.01); *G11C 19/0808* (2013.01); *H10B 61/00* (2023.02); *H10N 50/85* (2023.02)

(58) Field of Classification Search
CPC ...... H10N 50/10; H10N 50/85; G11C 11/161; G11C 11/1673; G11C 11/1675; G11C 19/0808; H10B 61/00
USPC ......................................................... 365/158
See application file for complete search history.

(56) References Cited

U.S. PATENT DOCUMENTS

| | | | |
|---|---|---|---|
| 2010/0315854 A1* | 12/2010 | Suzuki | G11C 11/1659 365/171 |
| 2012/0278582 A1 | 11/2012 | Fukami et al. | |
| 2018/0301199 A1* | 10/2018 | Sasaki | H10N 50/10 |
| 2020/0006642 A1 | 1/2020 | Ichikawa et al. | |
| 2022/0051708 A1 | 2/2022 | Yamada et al. | |

FOREIGN PATENT DOCUMENTS

| | | | | |
|---|---|---|---|---|
| JP | 2010010485 A | * | 1/2010 | ......... G11C 11/1659 |
| JP | 2017-118132 A | | 6/2017 | |
| JP | 2020-004865 A | | 1/2020 | |
| WO | 2011/052475 A1 | | 5/2011 | |
| WO | WO-2017183573 A1 | * | 10/2017 | ............. G06N 3/065 |
| WO | 2020/230877 A1 | | 11/2020 | |

* cited by examiner

*Primary Examiner* — Fernando Hidalgo
(74) *Attorney, Agent, or Firm* — Oliff PLC

(57) ABSTRACT

A domain wall movement element includes a reference layer, nonmagnetic layer, domain wall movement layer, and first and second magnetization fixed layers. The first layer is connected to the domain wall movement layer. The second layer is connected to the domain wall movement layer at a position different from the first in a first direction. The nonmagnetic layer is interposed between the reference layer and domain wall movement layer in a stacking direction. The nonmagnetic layer includes first and second regions. The first region includes an oxide of Mg or an oxide containing Mg and a nonmagnetic element other than Mg. The second region includes an oxide containing Mg and a nonmagnetic element. A concentration of the nonmagnetic element in the second region is higher than that of the first region by 0.1 atom % or more. The second region is discontinuous in a plane orthogonal to the stacking direction.

9 Claims, 10 Drawing Sheets

DOMAIN WALL MOVEMENT ELEMENT, MAGNETORESISTIVE ELEMENT, AND MAGNETIC ARRAY

BACKGROUND OF THE INVENTION

Field of the Invention

The present disclosure relates to a domain wall movement element, a magnetoresistive element, and a magnetic array.

Description of Related Art

A magnetoresistive element that utilizes a change in resistance value (a change in magnetoresistance) based on a change in relative angle of a magnetization between two ferromagnetic layers is known. For example, a domain wall movement type magnetoresistive element (hereinafter referred to as a domain wall movement element) described in Patent Document 1 is an example of a magnetoresistive element. In the domain wall movement element, a resistance value in a stacking direction changes depending on a position of a domain wall, and data can be recorded in a multi-level or analog manner. The domain wall movement element has high linearity and symmetry in resistance change and excellent rewriting resistance, and is capable of high-speed operation.

PATENT DOCUMENTS

[Patent Document 1] PCT International Publication No. WO 2011/052475

SUMMARY OF THE INVENTION

In a domain wall movement element, a domain wall movement layer in which a domain wall moves is long in one direction. When a write current is applied to the domain wall movement layer, heat is generated in the domain wall movement layer. This heat generation reduces the stability of a magnetization and reduces the reliability of data written in the domain wall movement element.

The present disclosure has been made in view of the above problems, and an object of the present disclosure is to provide a domain wall movement element, a magnetoresistive element, and a magnetic array having high heat exhaust efficiency.

A domain wall movement element according to a first aspect includes a reference layer, a nonmagnetic layer, a domain wall movement layer, a first magnetization fixed layer, and a second magnetization fixed layer. The first magnetization fixed layer is connected to the domain wall movement layer. The second magnetization fixed layer is connected to the domain wall movement layer at a position different from the first magnetization fixed layer in a first direction. The nonmagnetic layer is interposed between the reference layer and the domain wall movement layer in a stacking direction. The nonmagnetic layer includes a first region and a second region. The first region includes an oxide of Mg or an oxide containing Mg and a nonmagnetic element other than Mg. The second region includes an oxide containing Mg and the nonmagnetic element. A concentration of the nonmagnetic element in the second region is higher than a concentration of the nonmagnetic element in the first region by 0.1 atom % or more. The second region is discontinuous in a plane orthogonal to the stacking direction.

DETAILED DESCRIPTION OF THE INVENTION

Figure 1:
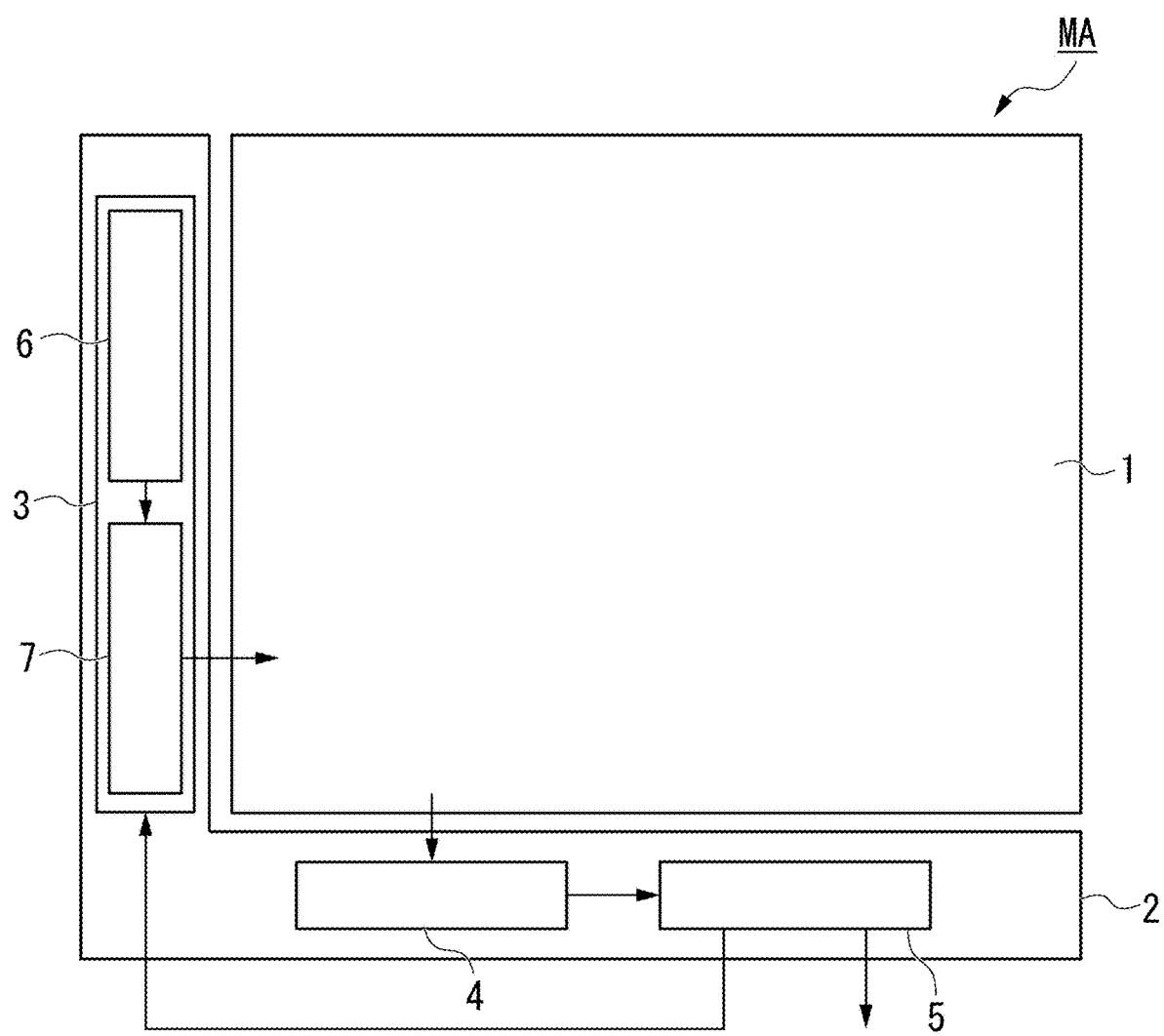
FIG. 1 is a block diagram of a magnetic array according to a first embodiment.

Hereinafter, the present embodiment will be described in detail with appropriate reference to the drawings. In the drawings used in the following description, feature portions may be enlarged for convenience to make the features of the present embodiment easy to understand, and dimensional ratios of each constituent element and the like may be different from the actual ones. Materials, dimensions, and the like exemplified in the following description are examples, and the present embodiment is not limited thereto and can be appropriately modified and carried out within the scope in which the effects of the present embodiment are exhibited.

First, directions will be defined. An x direction and a y direction are directions substantially parallel to one surface of a substrate Sub (see FIG. 3) that will be described below. The x direction is a longitudinal direction of a domain wall movement layer that will be described below. The x direction is an example of a first direction. The y direction is a direction orthogonal to the x direction when viewed in a stacking direction. A z direction is a direction from the substrate toward a domain wall movement element or a magnetoresistive element. The z direction is an example of the stacking direction. In the present specification, a+z direction may be expressed as "up" and a−z direction may be expressed as "down," but these expressions are for convenience and do not define the direction of gravity. Further, in this description, the term "extending in the x direction" means that, for example, the dimension in the x direction is larger than the smallest dimension among the dimensions in the x direction, the y direction, and the z direction. The same applies to cases of extending in other directions.

First Embodiment

FIG. 1 is a block diagram of a magnetic array MA according to a first embodiment. The magnetic array MA has an integrated region 1 and a peripheral region 2. The magnetic array MA can be used in, for example, a magnetic memory, a product and sum calculation device, a neuromorphic device, a spin memristor, or a magneto-optical element.

The integrated region 1 is a region in which a plurality of domain wall movement elements are integrated. In a case where the magnetic array MA is used as a memory, data is accumulated in the integrated region 1. In a case where the magnetic array MA is used as a neuromorphic device, learning and inference are performed in the integrated region 1.

The peripheral region 2 is a region in which a control element that controls the operation of the domain wall movement element within the integrated region 1 is mounted. The peripheral region 2 includes, for example, a control device 3, a resistance detection device 4, and an output part 5.

The control device 3 is configured to be able to apply a pulse to at least one of the plurality of domain wall movement elements within the integrated region 1. The control device 3 includes, for example, a control part 6 and a power supply 7.

The control part 6 includes, for example, a processor and a memory. The processor is, for example, a central processing unit (CPU). The processor operates on the basis of an operation program stored in the memory. The control part 6 controls, for example, the address of a domain wall movement element to which a pulse is applied, the magnitude (the voltage, the pulse length) of a pulse applied to a predetermined domain wall movement element, and the like. In addition to this, the control part 6 may also include a clock, a counter, a random number generator, and the like. The clock serves as an indicator of the timing of applying a pulse, and the counter counts the number of times the pulse is applied. The power supply 7 applies a pulse to the domain wall movement element according to instructions from the control part 6.

The resistance detection device 4 is configured to be able to detect the resistance value of the domain wall movement element within the integrated region 1. The resistance detection device 4 may detect the resistance of each domain wall movement element in the integrated region 1, or may detect the total resistance of domain wall movement elements belonging to the same column, for example. The resistance detection device 4 may have, for example, a comparator that performs comparison in magnitude of the detected resistance value. The comparator may compare, for example, the detected resistance values with each other, or the detected resistance value with a reference resistance value set in advance.

The output part 5 is connected to the resistance detection device 4. The output part 5 includes, for example, a processor, an output capacitor, an amplifier, a converter, and the like. In a case where the magnetic array MA is used as a neuromorphic device, the output part 5 may perform a calculation of substituting the detection results of the resistance detection device 4 into an activation function. The calculation is performed by a processor, for example. The output part 5 outputs the calculation results to the outside. In a case where the magnetic array MA is used as a neuromorphic device, for example, an operation such as outputting the calculation result as an input signal for another magnetic array may be performed, or an operation such as outputting the calculation results to the outside as an identification rate may be performed. Further, the output part 5 may feed the calculation results back to the control device 3.

Figure 2:
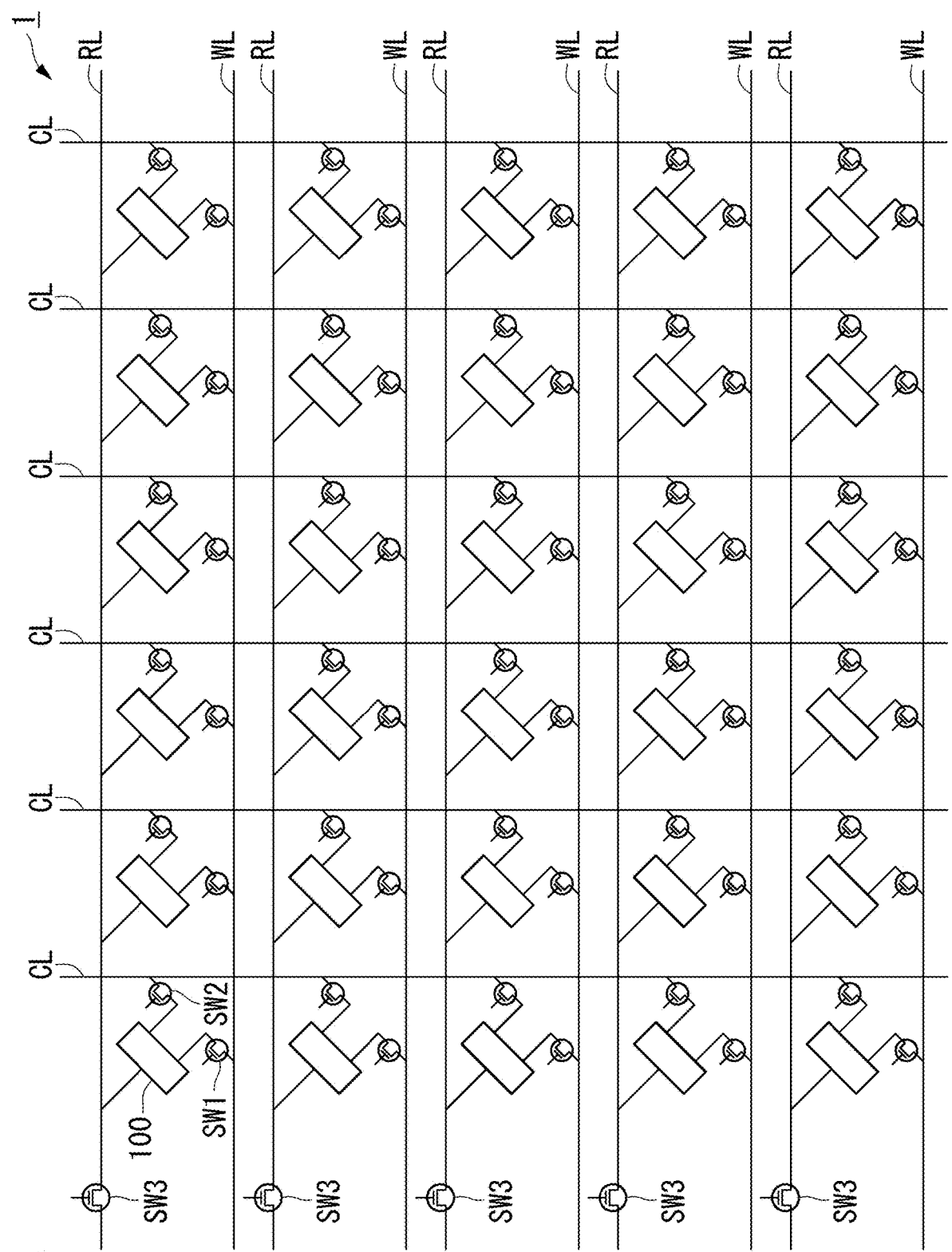
FIG. 2 is a circuit diagram of an integrated region of the magnetic array according to the first embodiment.

FIG. 2 is a circuit diagram of the integrated region 1 according to the first embodiment. The integrated region 1 includes a plurality of domain wall movement elements 100, a plurality of write wirings WL, a plurality of common wirings CL, a plurality of read wirings RL, a plurality of first switches SW1, and a plurality of second switches SW2. A third switch SW3 may belong to the control device 3 of the peripheral region 2, for example.

The plurality of domain wall movement elements 100 are arranged, for example, in a matrix. The plurality of domain wall movement elements 100 are not limited to those in which real elements are arranged in a matrix, and may be those in which real elements are arranged in a matrix in a circuit diagram.

Each of the write wirings WL is used when data is written. Each of the write wirings WL electrically connects the control device 3 and one or more domain wall movement elements 100 to each other. Each of the common wirings CL is used both when data is written and when data is read. Each of the common wirings CL is connected to, for example, the resistance detection device 4. Each of the common wirings CL may be provided in one of the plurality of domain wall movement elements 100 or may be provided over the plurality of domain wall movement elements 100. Each of the read wirings RL is used when data is read. Each of the read wirings RL electrically connects the control device 3 and one or more domain wall movement elements 100 to each other.

Each of the first switch SW1, the second switch SW2, and the third switch SW3 is an element that controls the flow of the current. Each of the first switch SW1, the second switch SW2, and the third switch SW3 is, for example, a transistor, an element using a phase change of a crystal layer such as an ovonic threshold switch (OTS), an element using a change in band structure such as a metal insulator transition (MIT) switch, an element using a breakdown voltage such as a Zener diode or an avalanche diode, or an element of which conductivity changes as an atomic position changes.

For example, the first switch SW1 and the second switch SW2 are connected to each domain wall movement element 100 one by one. For example, the first switch SW1 is connected between the domain wall movement element 100 and the write wiring WL. For example, the second switch SW2 is connected between the domain wall movement element 100 and the common wiring CL. For example, the third switch SW3 is connected over the plurality of domain wall movement elements 100. For example, the third switch SW3 is connected to the read wiring RL.

A positional relationship between the first switch SW1, the second switch SW2, and the third switch SW3 is not limited to the case shown in FIG. 2. For example, the first switch SW1 may be connected over the plurality of domain wall movement elements 100 and may be located upstream of the write wiring WL. Further, for example, the second switch SW2 may be connected over the plurality of domain wall movement elements 100 and may be located upstream of the common wiring CL. Further, for example, the third switch SW3 may be connected to each domain wall movement element 100 one by one.

Figure 3:
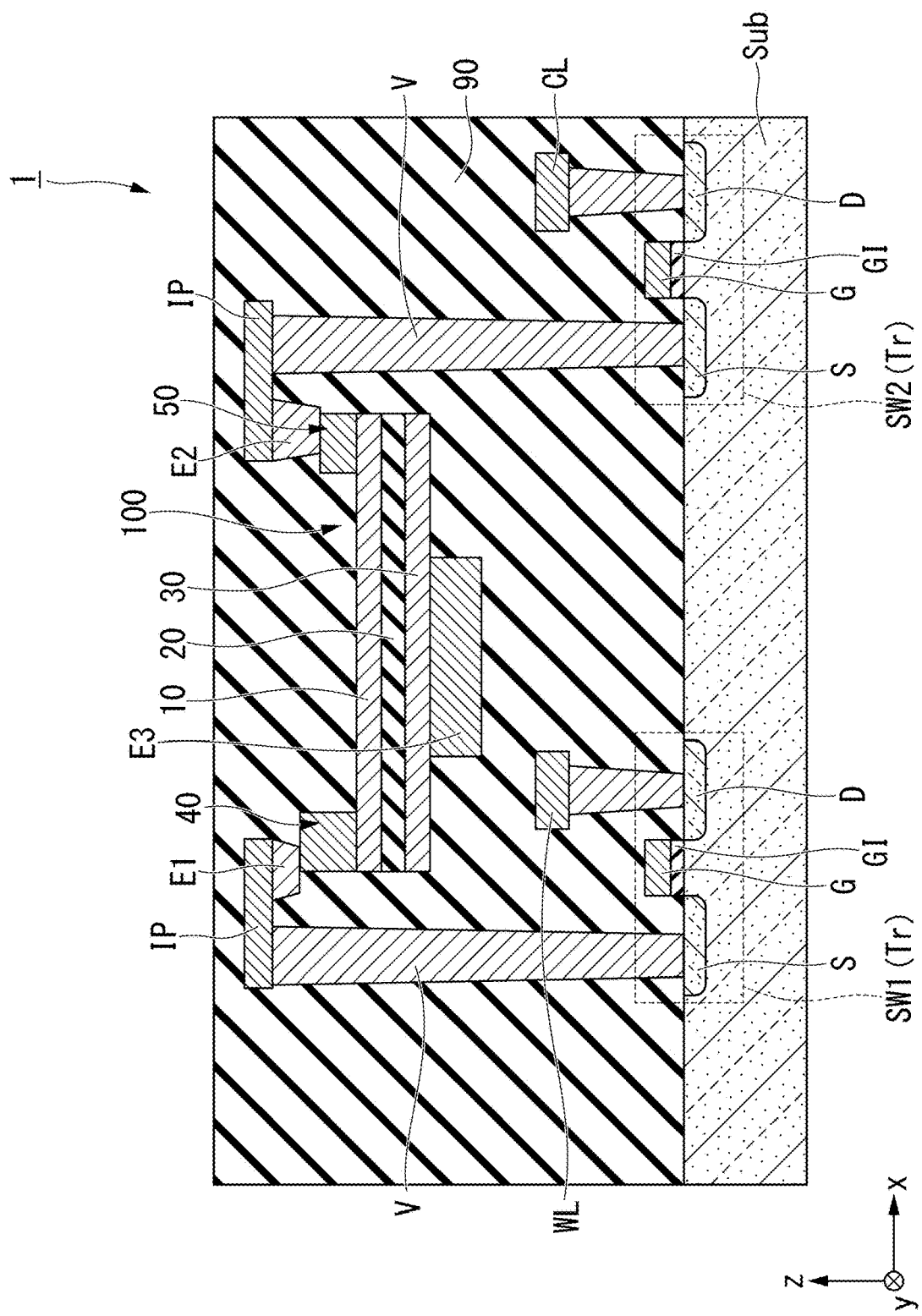
FIG. 3 is a cross-sectional view of the vicinity of a domain wall movement element of the magnetic array according to the first embodiment.

FIG. 3 is a cross-sectional view of the vicinity of the domain wall movement element 100 of the integrated region 1 according to the first embodiment. FIG. 3 is a cross section of one domain wall movement element 100 in FIG. 2 along an xz plane passing through the center of the width of a domain wall movement layer 10 in the y direction.

Each of the first switch SW1 and the second switch SW2 shown in FIG. 3 is a transistor Tr. The transistor Tr has a gate electrode G, a gate insulating film GI, a source S, and a drain D. The source S and the drain D are predetermined according to a flow direction of the current and both are active regions of a semiconductor. FIG. 3 shows only one example, and a positional relationship between the source S and the drain D may be reversed. The substrate Sub is, for example, a semiconductor substrate. The third switch SW3 is electrically connected to the read wiring RL and is located at, for example, a position shifted in the y direction of FIG. 3.

The transistor Tr, the write wiring WL, the common wiring CL, the read wiring RL, and the domain wall movement element 100 are connected by a via wiring V extending in the z direction or an in-plane wiring IP extending in any direction within an xy plane. The via wiring V and the in-plane wiring IP contain a conductive material. An insulating layer 90 is formed between different layers in the z direction, except for the via wiring V.

The insulating layer 90 is an insulating layer that insulates a portion between the wirings arranged in multiple layers and a portion between the elements. The domain wall movement element 100 and the transistor Tr are electrically separated by the insulating layer 90, except for the via wiring V. The insulating layer 90 is made of, for example, silicon oxide ($SiO_x$), silicon nitride ($SiN_x$), silicon carbide (SiC), chromium nitride, silicon carbonitride (SiCN), silicon oxynitride (SiON), aluminum oxide ($Al_2O_3$), zirconium oxide ($ZrO_x$), or the like.

Figure 4:
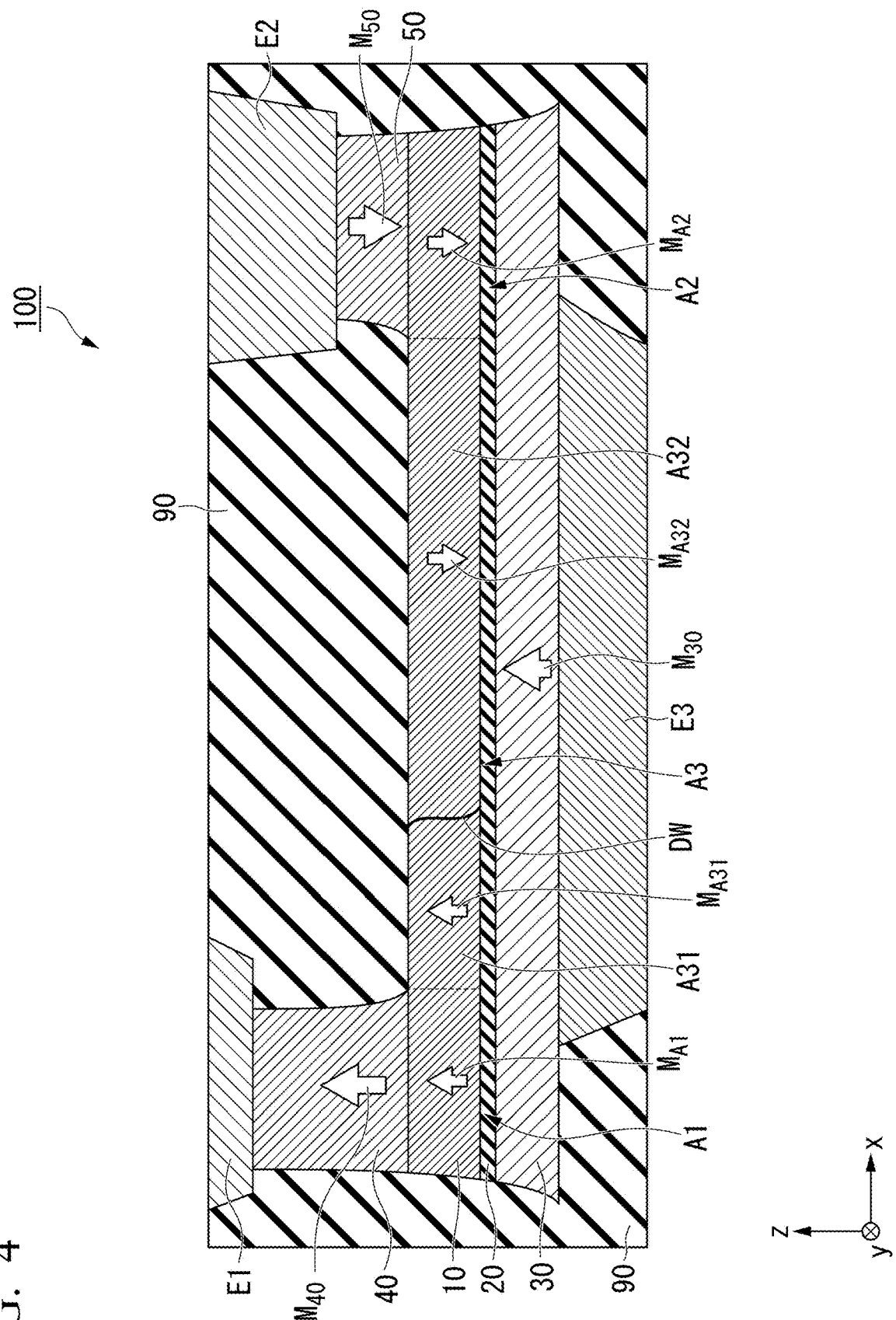
FIG. 4 is a cross-sectional view of the domain wall movement element according to the first embodiment.
Figure 5:
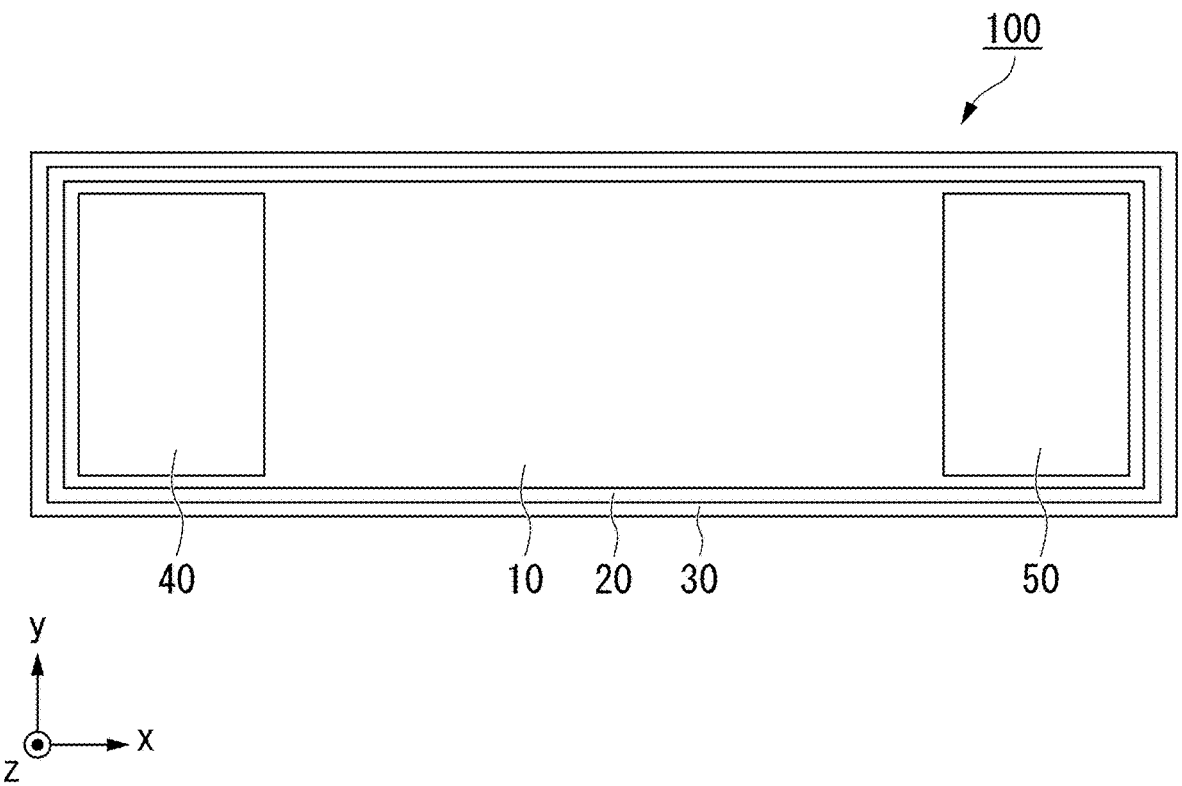
FIG. 5 is a plan view of the domain wall movement element according to the first embodiment.

FIG. 4 is a cross-sectional view of the domain wall movement element 100 along the xz plane passing through the center of the domain wall movement layer 10 in the y direction. An arrow shown in the drawing is an example of a magnetization orientation direction of the ferromagnetic material in an initial state where no external magnetic field is applied to the domain wall movement element 100. FIG. 5 is a plan view of the domain wall movement element 100 in the z direction.

The domain wall movement element 100 includes, for example, a domain wall movement layer 10, a nonmagnetic layer 20, a reference layer 30, a first magnetization fixed layer 40, a second magnetization fixed layer 50, a first electrode E1, a second electrode E2, and a third electrode E3. Each of the plurality of domain wall movement elements included in the integrated region 1 is, for example, the domain wall movement element 100 according to the present embodiment.

The domain wall movement layer 10 extends in the x direction. When viewed in the z direction, the length of the domain wall movement layer 10 in the x direction is longer than that in the y direction.

The domain wall movement layer 10 has two domains inside and has a domain wall DW at a boundary of the two domains. The domain wall movement layer 10 is, for example, a layer capable of magnetically recording information by changing a magnetic state. The domain wall movement layer 10 is also called an analog layer or a magnetic recording layer.

The domain wall movement layer 10 has a first magnetization region A1, a second magnetization region A2, and a third magnetization region A3.

The first magnetization region A1 is a region in which the orientation direction of a magnetization $M_{A1}$ is fixed in one direction. In the state in which the magnetization is fixed, the magnetization is not reversed in a normal operation of the domain wall movement element 100 (an external force exceeding estimation is not applied). The first magnetization region A1 is, for example, a region of the domain wall movement layer 10 that overlaps the first magnetization fixed layer 40 when viewed in the z direction. The magnetization $M_{A1}$ of the first magnetization region A1 is fixed, for example, by a magnetization $M_{40}$ of the first magnetization fixed layer 40.

The second magnetization region A2 is a region in which the orientation direction of a magnetization $M_{A2}$ is fixed in one direction. The orientation direction of the magnetization $M_{A2}$ of the second magnetization region A2 is different from the orientation direction of the magnetization $M_{A1}$ of the first magnetization region A1. The orientation direction of the magnetization $M_{A2}$ of the second magnetization region A2 is, for example, opposite to the orientation direction of the magnetization $M_{A1}$ of the first magnetization region A1. The second magnetization region A2 is, for example, a region of the domain wall movement layer 10 that overlaps the second magnetization fixed layer 50 when viewed in the z direction. The magnetization $M_{A2}$ of the second magnetization region A2 is fixed, for example, by a magnetization $M_{50}$ of the second magnetization fixed layer 50.

The third magnetization region A3 is a region other than the first magnetization region A1 and the second magnetization region A2 of the domain wall movement layer 10. The third magnetization region A3 is, for example, a region interposed between the first magnetization region A1 and the second magnetization region A2 in the x direction.

The third magnetization region A3 is a region in which a magnetization direction can change and the domain wall DW can move. The third magnetization region A3 is called a domain wall movable region. The third magnetization region A3 has a first domain A31 and a second domain A32. The first domain A31 and the second domain A32 have opposite magnetization orientation directions. A boundary between the first domain A31 and the second domain A32 is the domain wall DW. A magnetization $M_{A31}$ of the first domain A31 is oriented in the same direction as the magnetization $M_{A1}$ of the first magnetization region A1, for example. A magnetization $M_{A32}$ of the second domain A32 is oriented in the same direction as the magnetization $M_{A2}$ of the adjacent second magnetization region A2, for example. In principle, the domain wall DW moves in the third magnetization region A3 and does not invade the first magnetization region A1 and the second magnetization region A2.

When a volume ratio of the first domain A31 and the second domain A32 in the third magnetization region A3 changes, the domain wall DW moves. The domain wall DW moves by a write current being allowed to flow in the x direction of the third magnetization region A3. For example, when a write current (for example, a current pulse) is applied in a+x direction of the third magnetization region A3, electrons flow in a−x direction opposite to the current, and thus the domain wall DW moves in the −x direction. In a case in which a current flows from the first domain A31 to the second domain A32, the electrons spin-polarized in the second domain A32 reverse the magnetization $M_{A31}$ of the first domain A31. By reversing the magnetization $M_{A31}$ of the first domain A31, the domain wall DW moves in the +x direction.

The domain wall movement layer 10 is made of a magnetic material. The domain wall movement layer 10 may be a ferromagnetic material, a ferrimagnetic material, or a combination of these and an antiferromagnetic material whose magnetic state can be changed by a current. The domain wall movement layer 10 preferably has at least one element selected from the group consisting of Co, Ni, Fe, Pt, Pd, Gd, Tb, Mn, Ge, and Ga.

Examples of the material used for the domain wall movement layer 10 include a stacked film of Co and Ni, a stacked film of Co and Pt, a stacked film of Co and Pd, a stacked film of $Co_xFe_{1-x}B$ ($0 \le x \le 1$) and the same material as the nonmagnetic layer 20 which will be described below, MnGa-based materials, GdCo-based materials, and TbCo-based materials. In the ferrimagnetic materials such as the MnGa-based materials, the GdCo-based materials, and the TbCo-based materials, the saturation magnetization is small, and the threshold current required to move the domain wall DW is small. Further, in the stacked film of Co and Ni, the stacked film of Co and Pt, and the stacked film of Co and Pd, coercivity is large, and the movement speed of the domain wall DW is slow. The antiferromagnetic material is, for example, $Mn_3X$ (X is Sn, Ge, Ga, Pt, Ir, or the like), CuMnAs, $Mn_2Au$, or the like. The same material as the reference layer 30 which will be described below can also be applied as the domain wall movement layer 10. Two or more types of stacked films and materials can also be applied as the domain wall movement layer 10.

The reference layer 30 interposes the nonmagnetic layer 20 together with the domain wall movement layer 10. The reference layer 30 is located at a position where at least a portion thereof overlaps the third magnetization region A3 in the z direction. For example, the reference layer 30 is closer to the substrate Sub than the domain wall movement layer 10.

A magnetization $M_{30}$ of the reference layer 30 is less likely to be reversed than a magnetization of the third magnetization region A3 of the domain wall movement layer 10. In the magnetization $M_{30}$ of the reference layer 30, a direction does not change when an external force is applied to the extent that the magnetization of the third magnetization region A3 is reversed, and the magnetization $M_{30}$ is fixed. The reference layer 30 may be referred to as a fixed layer.

The reference layer 30 contains a ferromagnetic material. The reference layer 30 contains, for example, a material that easily obtains a coherent tunneling effect with the domain wall movement layer 10. The reference layer 30 contains, for example, a metal selected from the group consisting of Cr, Mn, Co, Fe, and Ni, an alloy containing one or more of these metals, an alloy containing these metals and at least one or more elements of B, C, and N, or the like. The reference layer 30 is, for example, Co—Fe, Co—Fe—B, or Ni—Fe. Further, the reference layer 30 may have a stacked film of Co and Ni, a stacked film of Co and Pt, or a stacked film of Co and Pd.

The reference layer 30 may be, for example, a Heusler alloy. The Heusler alloy is a half metal and has a high spin polarization. The Heusler alloy is an intermetallic compound having a chemical composition of XYZ or $X_2YZ$, where X is a transition metal element or noble metal element from the Co, Fe, Ni, or Cu group in the periodic table, Y is a transition metal element from the Mn, V, Cr, or Ti group in the periodic table or the same type of element as for X, and Z is a typical element from Groups III to V in the periodic table. The Heusler alloy is, for example, $Co_2FeSi$, $Co_2FeGe$, $Co_2FeGa$, $Co_2MnSi$, $Co_2Mn_{1-a}Fe_aAl_bSi_{1-b}$, $Co_2FeGe_{1-c}Ga_c$, or the like.

The reference layer 30 may have a plurality of layers and may have a synthetic antiferromagnetic structure (an SAF structure). The synthetic antiferromagnetic structure is constituted by two magnetic layers with a nonmagnetic spacer layer interposed therebetween. The magnetic layer contains, for example, a ferromagnetic material, and may contain an antiferromagnetic material such as IrMn or PtMn. The spacer layer contains, for example, at least one selected from the group consisting of Ru, Ir, and Rh.

The nonmagnetic layer 20 is interposed between the domain wall movement layer 10 and the reference layer 30 in the z direction. The nonmagnetic layer 20 inhibits magnetic coupling between the domain wall movement layer 10 and the reference layer 30. The nonmagnetic layer 20 is stacked on one surface of the reference layer 30.

Figure 6:
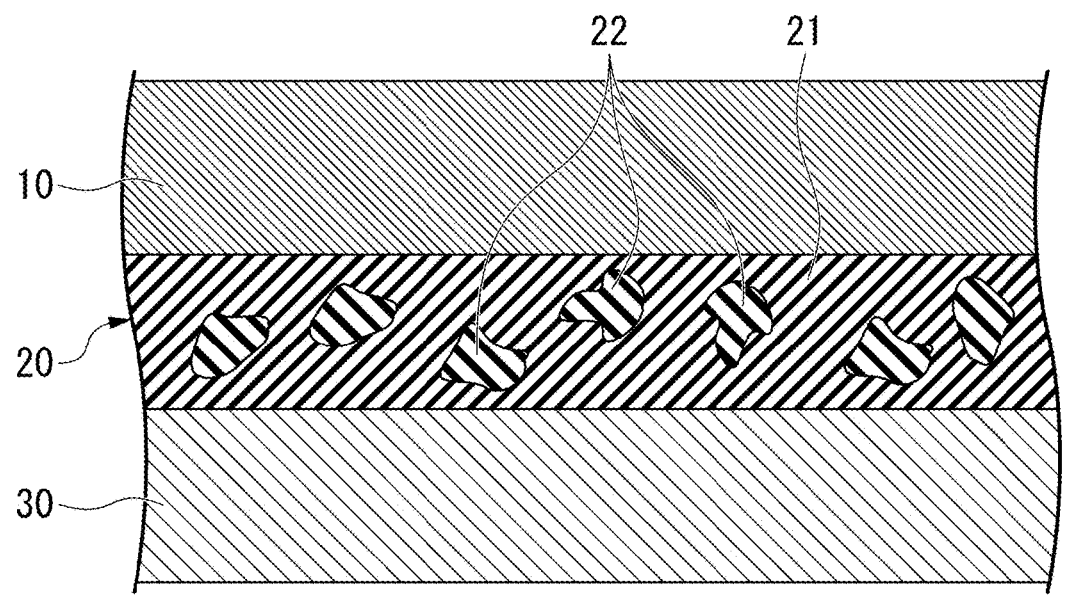
FIG. 6 is an enlarged view of the vicinity of a nonmagnetic layer according to the first embodiment.

FIG. 6 is a cross-sectional view of the vicinity of the nonmagnetic layer according to the first embodiment. The nonmagnetic layer 20 includes a first region 21 and a second region 22. The second region 22 is discontinuous in the x direction and the y direction. The second region 22 may also be discontinuous in the z direction. For example, pieces of the second region 22 are scattered within the nonmagnetic layer 20.

The first region 21 includes an oxide of Mg or an oxide containing Mg and a nonmagnetic element other than Mg. The nonmagnetic element other than Mg includes, for example, any one or more selected from the group consisting of B, C, Li, Al, Ti, V, Cr, Mn, Ni, Cu, Ga, Zr, Nb, Mo, Rh, Ag, In, Sn, Sb, Ta, W, Ir, and Au. The first region 21 is made of, for example, MgO or Mg—Al—O. Mg—Al—O is an oxide containing Mg and Al, and $MgAl_2O_4$ is an example of Mg—Al—O.

It is preferable that the interface between the nonmagnetic layer 20 and the domain wall movement layer 10 be made up of the first region 21. Further, it is preferable that the interface between the nonmagnetic layer 20 and the reference layer 30 be made up of the first region 21. The interface between the nonmagnetic layer 20 and the domain wall movement layer 10 and the interface between the nonmagnetic layer 20 and the reference layer 30 affect whether or not electrons coherently tunnel through the nonmagnetic layer 20. When electrons coherently tunnel through the nonmagnetic layer 20, the energy and momentum of the electrons are conserved, and the MR ratio of the domain wall movement element 100 increases. If the interface between the nonmagnetic layer 20 and the domain wall movement layer 10 and the interface between the nonmagnetic layer 20 and the reference layer 30 are made up of only a specific region, a crystal lattice is less likely to be disturbed at these interfaces, and electrons are becomes easier to coherently tunnel through the nonmagnetic layer 20.

The second region 22 includes an oxide containing Mg and a nonmagnetic element. The nonmagnetic element contained in the second region 22 is the same as the nonmagnetic element contained in the first region 21 in a case where the first region 21 contains the nonmagnetic element. The concentration of the nonmagnetic element in the second region 22 is higher than the concentration of the nonmagnetic element in the first region 21 by 0.1 atom % or more. The concentration of the nonmagnetic element is determined by elemental analysis using energy dispersive X-ray spectroscopy of a transmission electron microscope (TEM-EDX). The second region 22 is made of, for example, Mg—Al—O. For example, the second region 22 has a higher concentration of Al than the first region 21. The first region 21 may be made of MgO, and the second region may be made of M-Al—O.

The second region 22 has higher thermal conductivity than the first region 21. When the pieces of the second region 22 with high thermal conductivity are scattered within the nonmagnetic layer 20, heat is transmitted toward the reference layer 30 via the second region 22.

The average value of the shortest widths of the pieces of the second region 22 is, for example, 0.2 nm or more. The shortest widths of the pieces of the second region 22 are obtained from a cross-sectional image taken with a transmission electron microscope (TEM). Specifically, for example, the shortest widths are obtained by the following procedure. First, the nonmagnetic layers 20 is cut at an arbitrary cross section, and the second region 22 is specified using TEM-EDX. Next, the shortest widths of the pieces of the second region 22 in the cross section are measured. The shortest widths of the pieces of the second region 22 is measured at ten pieces of the second region 22, and the average value thereof is obtained. When the size of the second region 22 is sufficiently large, the thermal conductivity of the entire nonmagnetic layer 20 is improved.

A thickness of the nonmagnetic layer 20 is, for example, 20 Å or more and may be 25 Å or more. The thickness of each layer is the average value of the heights of the layers in the z direction measured at five different points in the x direction.

Each of the reference layer 30 and the nonmagnetic layer 20 is longer than the third magnetization region A3 in the x direction, for example. A portion where the reference layer 30 and the third magnetization region A3 face each other with the nonmagnetic layer 20 interposed therebetween is responsible for a resistance change of the domain wall movement element 100. When the length of each of the reference layer 30 and the nonmagnetic layer 20 in the x direction is longer than the length of the third magnetization region A3 in the x direction, the resistance change of the domain wall movement element 100 becomes gradual, and the width of the resistance change of the domain wall movement element 100 can be more easily divided into multiple values.

The reference layer 30 is longer than the domain wall movement layer 10 in the x direction, for example. When the reference layer 30 overlaps the entire domain wall movement layer 10 when viewed in the z direction, the heat radiation of the domain wall movement layer 10 is improved. As a result, the stability of the magnetization of the first magnetization region A1 and the magnetization of the second magnetization region A2 increases, and the reliability of the data of the domain wall movement element 100 increases.

The first magnetization fixed layer 40 is connected to the domain wall movement layer 10. The first magnetization fixed layer 40 is connected to the first magnetization region A1. The first magnetization fixed layer 40 fixes the magnetization $M_{A1}$ of the first magnetization region A1. The shape of the first magnetization fixed layer 40 in a plan view is not particularly limited. The shape of the first magnetization fixed layer 40 in a plan view may be, for example, rectangular as shown in FIG. 5, or may be circular.

The second magnetization fixed layer 50 is connected to the domain wall movement layer 10 at a position separated from the first magnetization fixed layer 40 in the x direction. The second magnetization fixed layer 50 is connected to the second magnetization region A2. The second magnetization fixed layer fixes the magnetization $M_{A2}$ of the second magnetization region A2. The shape of the second magnetization fixed layer 50 in a plan view may be, for example, rectangular as shown in FIG. 5, or may be circular.

The film thickness of the first magnetization fixed layer 40 and the film thickness of the second magnetization fixed layer 50 may be different. For example, the film thickness of the first magnetization fixed layer 40 is larger than the film thickness of the second magnetization fixed layer 50. This film thickness difference is used to generate a difference in the coercivity between the first magnetization fixed layer 40 and the second magnetization fixed layer 50.

Here, the positional relationship between the first magnetization fixed layer 40 and the second magnetization fixed layer 50 is not limited to the example shown in FIG. 4. The positional relationship between the first magnetization fixed layer 40 and the second magnetization fixed layer 50 may be opposite, and the first magnetization fixed layer 40 may be located at a position in the +x direction from the second magnetization fixed layer 50.

The first electrode E1 is connected to the first magnetization fixed layer 40. The first electrode E1 is, for example, a write electrode electrically connected to the write wiring WL. The second electrode E2 is connected to the second magnetization fixed layer 50. The second electrode E2 is, for example, a common electrode electrically connected to the common wiring CL. The third electrode E3 is connected to the reference layer 30. The third electrode E3 is, for example, a read electrode electrically connected to the read wiring RL.

The domain wall movement element 100 may have layers other than those described above. For example, an underlayer may be provided below the reference layer 30, and a cap layer may be provided above the domain wall movement layer 10.

It is possible to check a magnetization direction of each layer of the domain wall movement element 100 by measuring a magnetization curve, for example. The magnetization curve can be measured using, for example, a magneto optical Kerr effect (MOKE). The measurement using MOKE is a measurement method performed by making linearly polarized light incident on an object to be measured and using a magneto optical effect (a magnetic Kerr effect) in which rotation in a polarization direction thereof or the like occurs.

The domain wall movement element 100 is formed by a stacking step of each layer and a processing step of processing a part of each layer into a predetermined shape.

In the stacking step, each layer constituting the domain wall movement element 100 is formed. For the forming of each layer, a sputtering method, a chemical vapor deposition (CVD) method, an electron beam vapor deposition method (an EB vapor deposition method), an atomic laser deposit method, or the like can be used.

In the processing step, a part of a stacked body stacked in the stacking step is processed. The processing of the stacked body can be performed using photolithography, etching (for example, Ar etching), or the like.

The nonmagnetic layer 20 including the first region 21 and the second region 22 can be manufactured by the following procedure. First, a layer that will become the nonmagnetic layer 20 is formed. The layer that will become the nonmagnetic layer 20 can be formed by repeating the formation of a metal layer and the oxidation of the metal layer. The second region 22 can be formed by locally implanting the nonmagnetic element with a cluster ion beam after forming the metal layer. A portion where the nonmagnetic element is implanted with the cluster ion beam has a higher concentration of the nonmagnetic element than a portion where the nonmagnetic element is not implanted, and becomes the second region 22 after being oxidized.

The cluster ion beam is a technology that irradiates clusters formed from approximately several thousand gas atoms (molecules) with an ion beam. The cluster ion beam has extremely low energy per atom compared to the existing ion beam. The existing ion beam may cause damage to the nonmagnetic layer 20 and reduce the performance of the domain wall movement element 100, but the cluster ion beam causes less damage to the nonmagnetic layer 20. Furthermore, with the existing ion beam, single ions are implanted more locally, and thus a region like the second region 22 cannot be formed.

Next, a write operation of a signal to the magnetic array MA and a read operation of a signal from the magnetic array MA will be described.

First, the write operation of a signal to the magnetic array MA will be explained. The write operation is performed, for example, by a processor executing an operation program stored in the control part 6.

First, the control device 3 selects the domain wall movement element 100 to which a pulse is applied according to the operation program. In a case where the magnetic array MA is used as a magnetic memory, the domain wall movement element 100 to which a pulse is applied is an element that stores data. In a case where the magnetic array MA is used as a neural network, the domain wall movement element 100 to which a pulse is applied is an element that changes weight according to learning.

The control part 6 controls which domain wall movement element 100 of the plurality of domain wall movement elements 100 a pulse is applied to. The control part 6 turns on the first switch SW1 and the second switch SW2 connected to the domain wall movement element 100 to which a pulse is applied, and turns off the third switch SW3. Further, at least one of the first switch SW1 and the second switch SW2 connected to the domain wall movement element 100 to which no pulse is applied is turned off.

Then, the control device 3 outputs a write pulse toward the domain wall movement element 100 according to the operation program. The write pulse is applied between the first magnetization fixed layer 40 and the second magnetization fixed layer 50 along the domain wall movement layer 10 of the domain wall movement element 100. The write pulse may be a rectangular wave, a spike wave, or a wave having any other waveform. By changing the number of write pulses, the magnitude, or the like, the position of the domain wall DW changes, and a signal is written to a specific domain wall movement element 100.

Next, the read operation of a signal from the magnetic array MA will be explained. The read operation is performed, for example, by a processor executing an operation program stored in the control part 6.

First, the control device 3 selects the domain wall movement element 100 to which a read pulse is applied according to the operation program. In a case where the magnetic array MA is used as a magnetic memory, the domain wall movement element 100 to which a read pulse is applied is an element that reads data. In a case where the magnetic array MA is used as a neural network, application of a read pulse to a predetermined domain wall movement element 100 corresponds to a product calculation of the input and the weight. That is, in a case where the magnetic array MA is used as a neural network, the read operation is an identification calculation of the neural network.

The control part 6 controls which domain wall movement element 100 of the plurality of domain wall movement elements 100 a pulse is applied to. The control part 6 turns on the third switch SW3 and the second switch SW2 connected to the domain wall movement element 100 to which a pulse is applied, and turns off the first switch SW1. Further, at least one of the third switch SW3 and the second switch SW2 connected to the domain wall movement element 100 to which no pulse is applied is turned off.

Next, the control device 3 applies a read pulse to a predetermined domain wall movement element 100 according to the operation program. The read pulse is applied between the third electrode E3 and the second magnetization fixed layer 50, for example. The voltage of the read pulse is a voltage at which a current density lower than a critical current density required to move the domain wall DW of the domain wall movement layer 10 is obtained. That is, the read pulse does not move the domain wall DW.

The resistance detection device 4 detects the resistance value of the domain wall movement element 100 to which a read pulse is applied. The output part 5 outputs the calculation results to the outside, for example. With such a procedure, a signal can be read from a specific domain wall movement element 100.

Most of the heat generated in the domain wall movement layer 10 of the domain wall movement element 100 is exhausted from the first magnetization fixed layer 40 or the second magnetization fixed layer 50. The nonmagnetic layer 20 is made of an insulator and has poor thermal conductivity compared to the first magnetization fixed layer 40 and the second magnetization fixed layer 50. In a case where the nonmagnetic layer 20 has the second region 22, a heat conduction path via the second region 22 is formed, and thus the thermal conductivity of the nonmagnetic layer 20 is higher than that in a case where the nonmagnetic layer 20 does not have the second region 22. If the heat generated in the domain wall movement layer 10 can be exhausted from the reference layer 30 via the nonmagnetic layer 20, even in a case where the heat is generated at a position away from the first magnetization fixed layer 40 or the second magnetization fixed layer 50, this heat can be efficiently released.

The heat generated in the domain wall movement layer 10 reduces the stability of the magnetization of the domain wall movement layer 10 and the reference layer 30. The domain wall movement element 100 holds data by utilizing a change in resistance value according to a change in the relative angle of the magnetization. The reduced stability of the magnetization of the domain wall movement layer 10 and the reference layer 30 reduces the reliability of data held by the domain wall movement element 100.

Furthermore, if heat accumulates in the domain wall movement layer 10, the domain wall movement layer 10 may be disconnected. If the heat generated in the domain wall movement layer 10 can be efficiently exhausted, failure of the domain wall movement element 100 can be suppressed.

As described above, the domain wall movement element 100 according to the present embodiment has high heat exhaust efficiency, and thus has high data reliability and is less likely to fail.

The domain wall movement element 100 according to the first embodiment can be used in, for example, a magnetic memory or a neuromorphic device.

In the case of the magnetic memory, each of the domain wall movement elements 100 functions as an element that stores data. The resistance of the domain wall movement element 100 changes at the position of the domain wall DW of the domain wall movement element 100, and this resistance value is stored as data.

In the case of the neuromorphic device, each of the domain wall movement elements 100 functions as a product calculation element. The resistance of the domain wall movement element 100 changes at the position of the domain wall DW of the domain wall movement element, and this resistance value represents the weight of synapses.

A specific example of the first embodiment has been presented and its configuration has been specifically explained above, but the present disclosure is not limited to this example.

Figure 7:
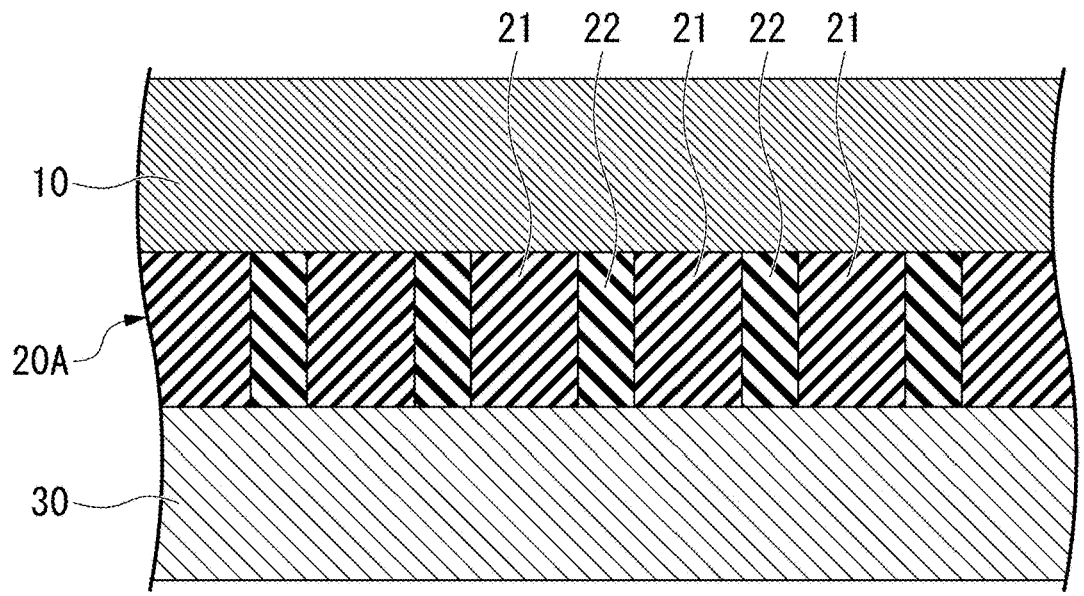
FIG. 7 is an enlarged view of the vicinity of a nonmagnetic layer according to a first modification example.

For example, FIG. 7 is an enlarged view of the vicinity of a nonmagnetic layer 20A a domain wall movement element according to a first modification example. In the first modification example, the same constituent elements as those in the first embodiment are designated by the same reference signs.

The nonmagnetic layer 20A shown in FIG. 7 has a first region 21 and a second region 22. The second region 22 shown in FIG. 7 is continuous in the z direction. The second region 22 is exposed at the interface between the nonmagnetic layer 20A and the domain wall movement layer 10, and at the interface between the nonmagnetic layer 20A and the reference layer 30. The domain wall movement element according to the first modification example also has the same effect as the domain wall movement element 100 described above.

Figure 8:
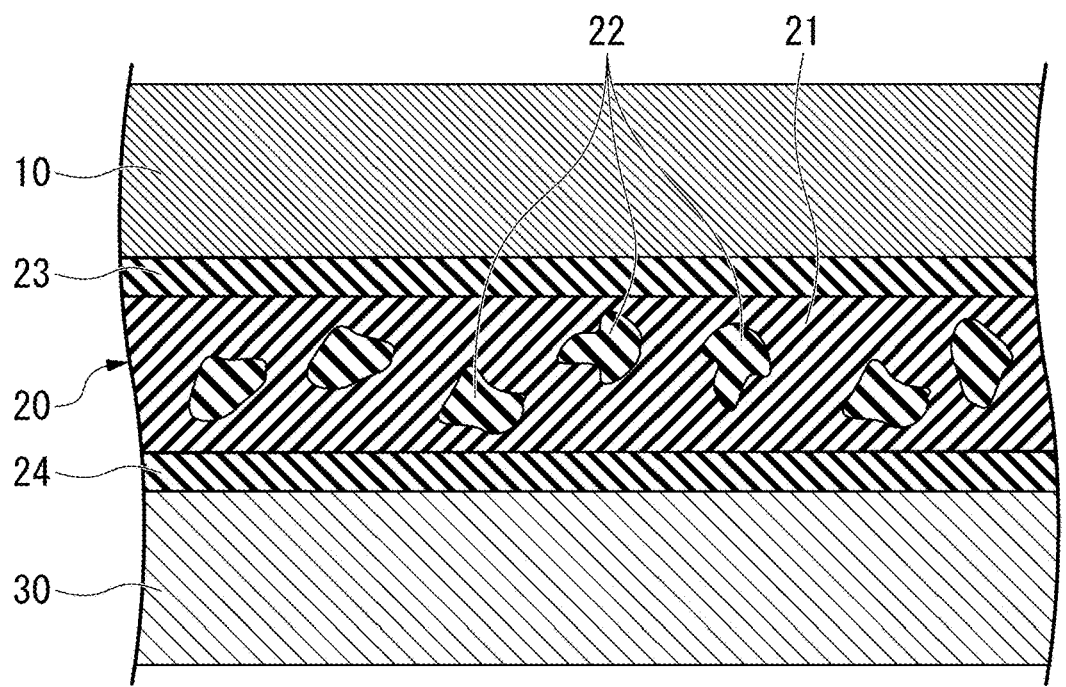
FIG. 8 is an enlarged view of the vicinity of a nonmagnetic layer according to a second modification example.

Further, for example, FIG. 8 is an enlarged view of the vicinity of a nonmagnetic layer 20 of a domain wall movement element according to a second modification example. In the second modification example, the same constituent elements as those in the first embodiment are designated by the same reference signs.

The domain wall movement element shown in FIG. 8 has a second nonmagnetic layer 23 and a third nonmagnetic layer 24. The second nonmagnetic layer 23 and the third nonmagnetic layer 24 may each have the same composition as the first region 21, or may be made of a material that facilitates coherent tunneling of electrons between the domain wall movement layer 10 and the reference layer 30. When the domain wall movement element has the second nonmagnetic layer 23 and the third nonmagnetic layer 24, coherent tunneling of electrons is facilitated between the domain wall movement layer 10 and the reference layer 30.

Although FIG. 8 shows an example in which the domain wall movement element has both the second nonmagnetic layer 23 and the third nonmagnetic layer 24, the domain wall movement element may have only one of them.

Figure 9:
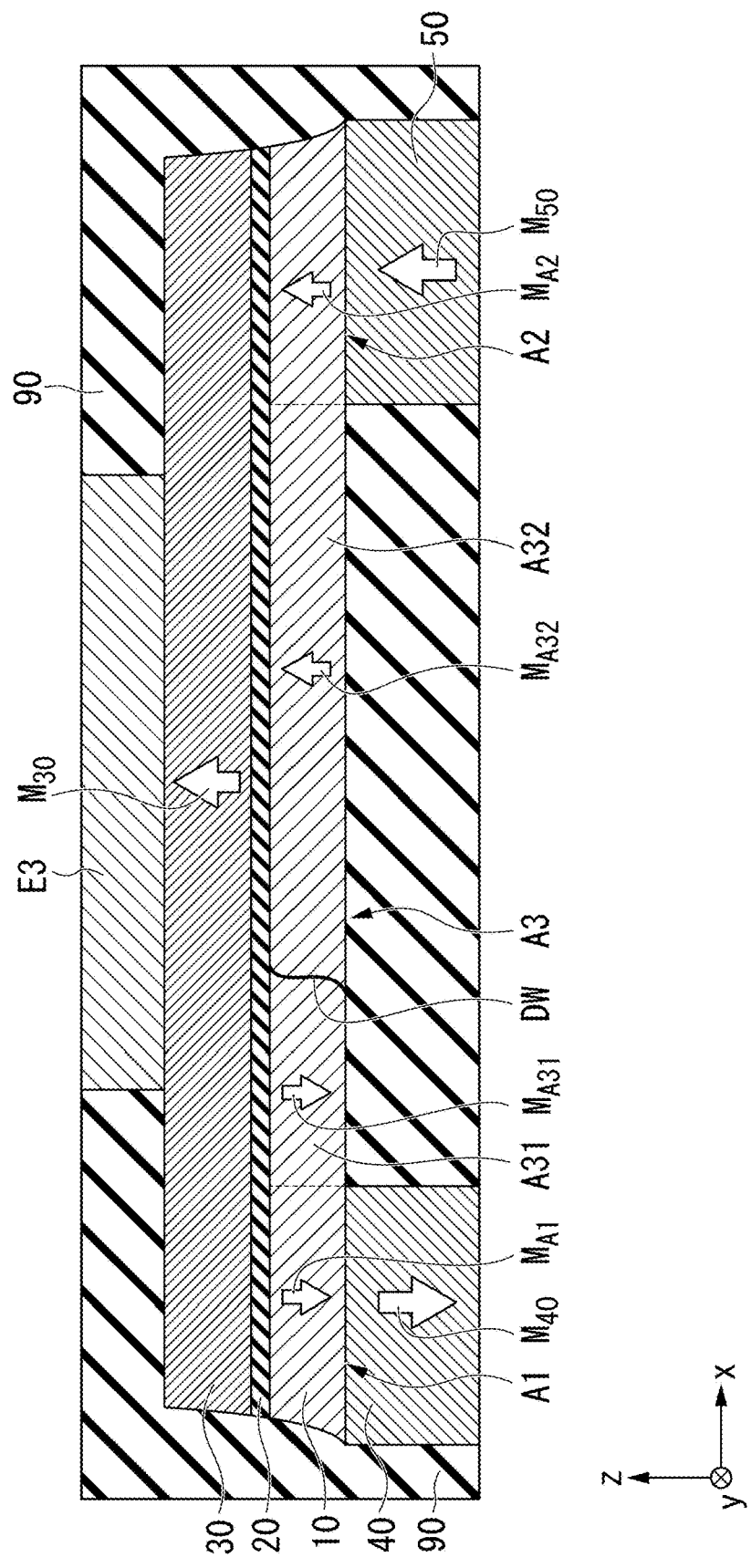
FIG. 9 is a cross-sectional view of a domain wall movement element according to a third modification example.

Further, for example, FIG. 9 is an enlarged view of the vicinity of a nonmagnetic layer 20 of a domain wall movement element according to a third modification example. In the third modification example, the same constituent elements as those in the first embodiment are designated by the same reference signs.

The domain wall movement element shown in FIG. 9 has a top pin structure in which the reference layer 30 is located further away from the substrate Sub than the domain wall movement layer 10. The domain wall movement element may have a bottom pin structure as shown in FIG. 4 or a top pin structure.

Second Embodiment

Figure 10:
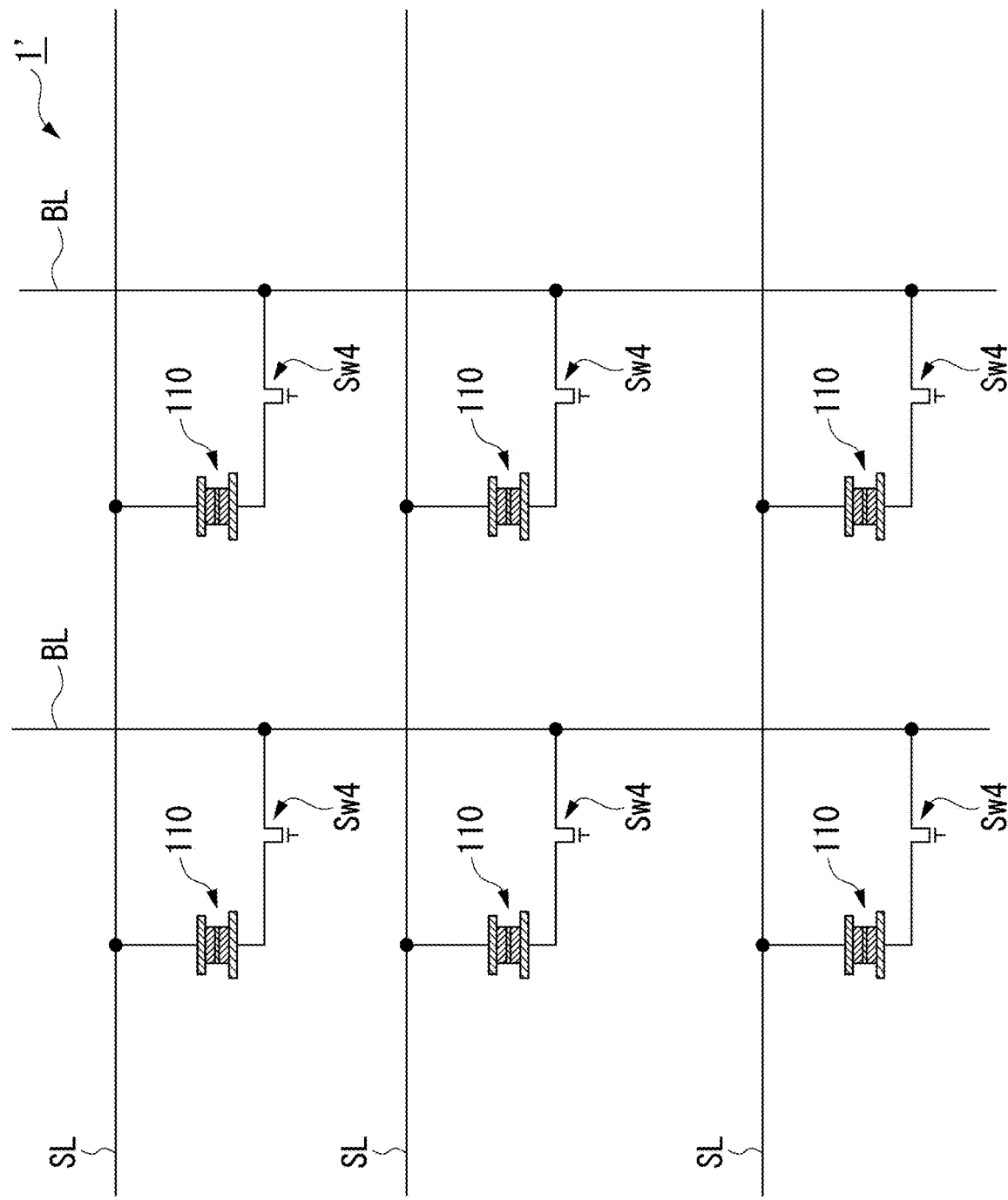
FIG. 10 is a circuit diagram of an integrated region of a magnetic array according to the second embodiment.

FIG. 10 is a circuit diagram of an integrated region 1' according to a second embodiment. It is possible to replace the integrated region 1 with the integrated region 1'.

The integrated region 1' includes a plurality of magnetoresistive elements 110, a plurality of source lines SL, a plurality of bit lines BL, and a plurality of fourth switching elements Sw4. The integrated region 1' is a magnetic array including the plurality of magnetoresistive elements 110.

The magnetoresistive elements 110 are arranged, for example, in a matrix. Each of the magnetoresistive elements 110 is connected to the source line SL and the bit line BL.

The flow of a current to the magnetoresistive element 110 is controlled by the fourth switching element Sw4. Data is written and read in the magnetoresistive element 110 by turning on the fourth switching element Sw4. The magnetoresistive element 110 writes data using a spin transfer torque generated by a current flowing in the stacking direction. The fourth switching element Sw4 is the same as the first switching element Sw1 or the like.

Figure 11:
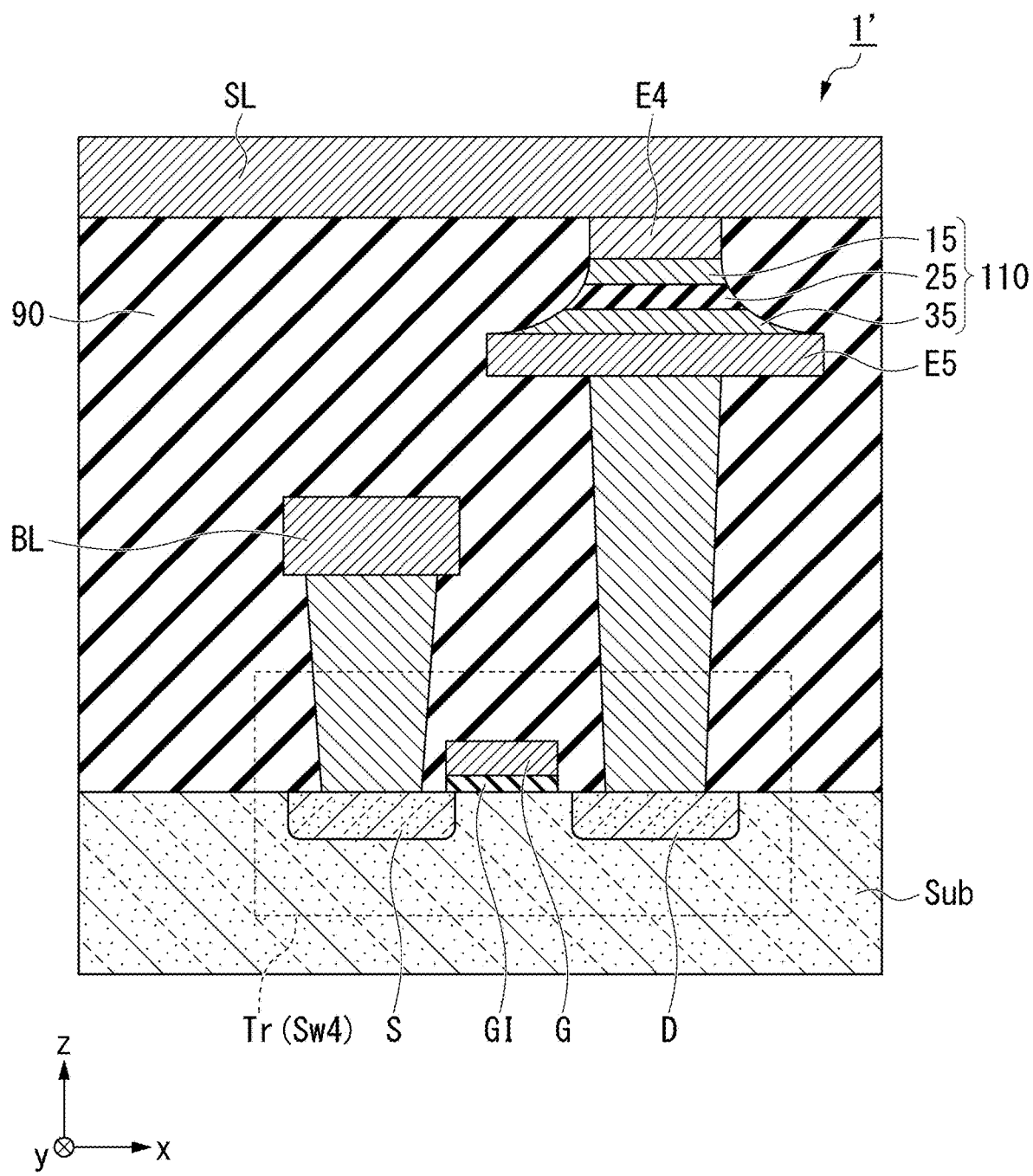
FIG. 11 is a cross-sectional view of the vicinity of a magnetoresistive element of the magnetic array according to the second embodiment.
Figure 12:
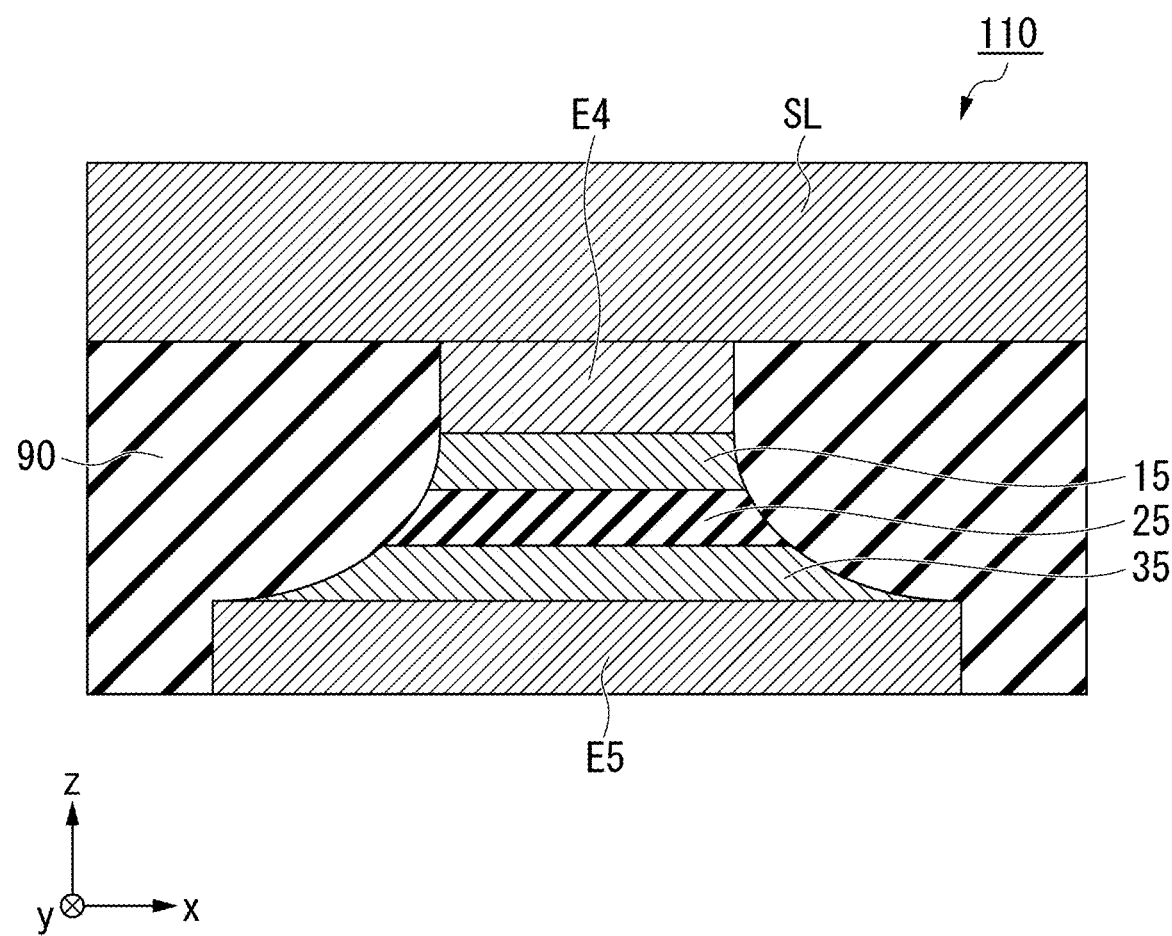
FIG. 12 is a cross-sectional view of the magnetoresistive element of the magnetic array according to the second embodiment.

FIG. 11 is a cross-sectional view of the vicinity of a magnetoresistive element 110 according to the second embodiment. FIG. 12 is an enlarged view of the magnetoresistive element 110 according to the second embodiment. The periphery of the magnetoresistive element 110 and a transistor Tr is covered with an insulating layer 90.

The magnetoresistive element 110 has a free layer 15, a nonmagnetic layer 25, and a reference layer 35. The free layer 15 corresponds to the domain wall movement layer 10 and can be made of the same material as the domain wall movement layer 10. The reference layer 35 corresponds to the reference layer 30 and can be made of the same material as the reference layer 30. The nonmagnetic layer 25 includes a first region and a second region. The relationship between the first region and the second region is the same as the relationship between the first region 21 and the second region 22 in the nonmagnetic layer 20 of the domain wall movement element 100.

The magnetoresistive element 110 according to the second embodiment has the same effect as the domain wall movement element 100 according to the first embodiment.

Although the preferred embodiment of the present disclosure has been described in detail above, the present disclosure is not limited to this embodiment. For example, the characteristic configurations of the above embodiments may be combined with each other.

EXPLANATION OF REFERENCES

1 Integrated region
2 Peripheral region
3 Control device
4 Resistance detection device
5 Output part
6 Control part
7 Power supply
10 Domain wall movement layer
15 Free layer
20, 25 Nonmagnetic layer
21 First region
22 Second region
23 Second nonmagnetic layer
24 Third nonmagnetic layer
30, 35 Reference layer
40 First magnetization fixed layer
50 Second magnetization fixed layer
90 Insulating layer
100 Domain wall movement element
110 Magnetoresistive element
DW Domain wall
E1 First electrode
E2 Second electrode
E3 Third electrode

What is claimed is:

1. A domain wall movement element comprising a reference layer, a nonmagnetic layer, a domain wall movement layer, a first magnetization fixed layer, and a second magnetization fixed layer, wherein the first magnetization fixed layer is connected to the domain wall movement layer, wherein the second magnetization fixed layer is connected to the domain wall movement layer at a position different from the first magnetization fixed layer in a first direction, wherein the nonmagnetic layer is interposed between the reference layer and the domain wall movement layer in a stacking direction, wherein the nonmagnetic layer includes a first region and a second region, wherein the first region includes an oxide of Mg or an oxide containing Mg and a nonmagnetic element other than Mg, wherein the second region includes an oxide containing Mg and the nonmagnetic element, wherein a concentration of the nonmagnetic element in the second region is higher than a concentration of the nonmagnetic element in the first region by 0.1 atom % or more, and wherein the second region is discontinuous in a plane orthogonal to the stacking direction.

2. The domain wall movement element according to claim 1, wherein the second region is discontinuous in the stacking direction.

3. The domain wall movement element according to claim 1, wherein an average value of shortest widths of pieces of the second region is 0.2 nm or more.

4. The domain wall movement element according to claim 1, wherein an interface between the nonmagnetic layer and the domain wall movement layer is made up of the first region.

5. The domain wall movement element according to claim 1, wherein an interface between the nonmagnetic layer and the reference layer is made up of the first region.

6. The domain wall movement element according to claim 1, wherein the nonmagnetic element includes any one or more selected from the group consisting of B, C, Li, Al, Ti, V, Cr, Mn, Ni, Cu, Ga, Zr, Nb, Mo, Rh, Ag, In, Sn, Sb, Ta, W, Ir, and Au.

7. A magnetoresistive element comprising a reference layer, a nonmagnetic layer, and a free layer, wherein the nonmagnetic layer is interposed between the reference layer and the free layer in a stacking direction, wherein the nonmagnetic layer includes a first region and a second region, wherein the first region includes an oxide of Mg or an oxide containing Mg and a nonmagnetic element other than Mg, wherein the second region includes an oxide containing Mg and the nonmagnetic element, wherein a concentration of the nonmagnetic element in the second region is higher than a concentration of the nonmagnetic element in the first region by 0.1 atom % or more, and wherein the second region is discontinuous in a plane orthogonal to the stacking direction.

8. A magnetic array comprising a plurality of domain wall movement elements, wherein at least one of the plurality of domain wall movement elements is the domain wall movement element according to claim 1.

9. A magnetic array comprising a plurality of magnetoresistive elements, wherein at least one of the plurality of magnetoresistive elements is the magnetoresistive element according to claim 7.

* * * * *